United States Patent
Mizutani et al.

(10) Patent No.: US 9,863,463 B2
(45) Date of Patent: Jan. 9, 2018

(54) BALL JOINT

(71) Applicant: KABUSHIKI KAISHA SOMIC ISHIKAWA, Shizuoka (JP)

(72) Inventors: Masayuki Mizutani, Hamamatsu (JP); Masaki Sobukawa, Hamamatsu (JP)

(73) Assignee: KABUSHIKI KAISHA SOMIC ISHIKAWA, Tokyo (JP)

( * ) Notice: Subject to any disclaimer, the term of this patent is extended or adjusted under 35 U.S.C. 154(b) by 331 days.

(21) Appl. No.: 14/403,173

(22) PCT Filed: May 15, 2013

(86) PCT No.: PCT/JP2013/063489
§ 371 (c)(1),
(2) Date: Nov. 22, 2014

(87) PCT Pub. No.: WO2013/176008
PCT Pub. Date: Nov. 28, 2013

(65) Prior Publication Data
US 2016/0177999 A1    Jun. 23, 2016

(30) Foreign Application Priority Data
May 25, 2012 (JP) .................................. 2012-119770

(51) Int. Cl.
*F16C 11/06* (2006.01)

(52) U.S. Cl.
CPC ...... *F16C 11/0671* (2013.01); *F16C 11/0623* (2013.01); *F16C 11/0685* (2013.01);
(Continued)

(58) Field of Classification Search
CPC ... F16C 11/06; F16C 11/0671; F16C 11/0666; F16C 11/0676; B60G 7/005;
(Continued)

(56) References Cited

U.S. PATENT DOCUMENTS 3,220,756 A * 11/1965 Templeton ............... B62D 7/16
                                                              277/390
4,549,830 A    10/1985 Mette .......................... 403/134
(Continued)

FOREIGN PATENT DOCUMENTS

DE    44 13 664    * 12/1994 ............. F16C 11/06
EP    2 292 941    *  9/2011 ............. F16C 11/06
(Continued)

*Primary Examiner* — Michael P Ferguson
(74) *Attorney, Agent, or Firm* — Michael Tobias

(57) ABSTRACT

A ball joint has a dust cover fitted onto the outer periphery of a socket formed into the shape of a cylinder with a bottom. The socket has a dust cover groove into which a socket-fitting portion of the dust cover is fitted, and a dust cover-recieving surface for supporting a socket-facing surface of the dust cover. The dust cover-recieving surface inclines toward the socket-facing surface while extending from the outer side toward the inner side. Radial projections are formed on the inner peripheral surface of the socket-fitting portion of the dust cover. An axial projection which projects toward the dust cover-recieving surface is formed on the socket-facing surface of the dust cover.

13 Claims, 3 Drawing Sheets

(52) U.S. Cl.
CPC ....... *F16C 11/0633* (2013.01); *F16C 2240/30* (2013.01); *F16C 2326/05* (2013.01); *F16C 2326/24* (2013.01)

(58) Field of Classification Search
CPC ..... Y10T 403/32721; Y10T 403/32729; Y10T 403/327237; Y10T 403/31; Y10T 403/315
USPC .......................................... 403/122, 133, 134
See application file for complete search history.

(56) References Cited

U.S. PATENT DOCUMENTS

| | | | | |
|---|---|---|---|---|
| 6,962,351 | B2 * | 11/2005 | De Freitas | F16C 11/0671 277/634 |
| 8,414,215 | B2 * | 4/2013 | Langendoen | F16C 11/0676 277/635 |
| 8,684,621 | B2 * | 4/2014 | Forthaus | F16C 7/02 403/134 |
| 2005/0276656 | A1 * | 12/2005 | Lim | F16C 7/02 403/56 |
| 2007/0231060 | A1 * | 10/2007 | Abels | F16C 11/0671 403/76 |
| 2009/0047063 | A1 * | 2/2009 | Shirai | F16C 11/0604 403/133 |
| 2009/0209353 | A1 * | 8/2009 | Abels | B29C 45/2612 464/106 |

FOREIGN PATENT DOCUMENTS

| | | | | |
|---|---|---|---|---|
| JP | 4524726 | | 8/1970 | |
| JP | 5355054 | | 5/1978 | |
| JP | 5449443 | | 4/1979 | |
| JP | 0552443 | | 7/1993 | |
| JP | 10331837 | | 12/1998 | |
| JP | 2009293647 | | 12/2009 | |
| JP | 2012119770 | A * | 6/2012 | ............. F16C 11/06 |
| JP | 2014191869 | A * | 10/2014 | |

* cited by examiner

BALL JOINT

TECHNICAL FIELD

The present invention relates to a ball joint used in a suspension or steering mechanism of a vehicle.

BACKGROUND ART

A ball joint for movably connecting shaft-like components to each other is conventionally used in suspensions and steering mechanisms for vehicles such as automobiles. In general, a ball joint is primarily constituted such that a spherical ball portion formed on an end portion of a shaft-like ball stud is slidably received in a cylindrical socket having a bottom through a ball seat (also referred to as a "bearing seat") formed of resin.

In such a ball joint, as shown in below-listed Patent Document 1, in order to prevent entry or invasion of foreign substances such as water droplets and dust into the socket in which the ball portion slidingly moves and to prevent leakage of grease charged into the socket, a dust cover is provided to cover an opening portion of the socket. This dust cover is formed of an elastically deformable material (e.g., a rubber material) and has generally a cylindrical tubular shape. One open end portion of the dust cover is fitted onto the outer periphery of the opening portion of the socket, and the other open end portion of the dust cover is fitted onto the outer periphery of the ball stud. In order to prevent the dust cover from coming off and to prevent entry of foreign substances into a region where the dust cover is mated with the socket, a retaining ring is fitted onto the dust cover in order to tighten the outer periphery of the dust cover which is fitted onto the outer periphery of the socket.

PRIOR ART DOCUMENTS

Patent Documents

Patent Document 1: Japanese Patent Application Laid-Open (kokai) No. 2009-293647

SUMMARY OF THE INVENTION

However, a ball joint configured such that a dust cover is fixed to a socket by a retaining ring always needs to have enhanced waterproofing performance for preventing entry of foreign substances such as water droplets or oil droplets into the socket, and particularly into a fitting region where the dust cover is fitted onto the socket.

The present invention was accomplished in order to solve the above-described problem, and its object is to provide a ball joint in which a dust cover is fixed to a socket by a retaining ring and which has enhanced waterproofing performance at a fitting region where the dust cover is fitted onto the socket.

In order to achieve the above-described object, the present invention provides a ball joint comprising a ball stud which has a shaft-shaped stud portion and a ball portion which is formed at an end of the stud portion and has a spherical surface; a socket which has a holding portion for slidably accommodating the ball portion of the ball stud, a dust cover-receiving surface extending from an outer periphery of the holding portion, and a stud-penetration opening portion which communicates with the holding portion and through which the ball stud penetrates in such a manner that the ball stud can swing; a tubular dust cover which is formed of an elastic material, one open end of which forms a socket-fitting portion which is fitted onto an outer periphery of the stud-penetration opening portion, the other open end of which is fitted onto an outer periphery of the ball stud, and which covers the stud-penetration opening portion; and a retaining ring which tightens an outer periphery of the socket-fitting portion which is fitted onto the outer periphery of the stud-penetration opening portion, wherein the dust cover has a socket-facing surface which is formed on the side toward the one open end of the dust cover and faces the dust cover-receiving surface, and an annular axial projection which occupies a portion of the socket-facing surface in a radial direction thereof and which projects toward the dust cover-receiving surface; and wherein at least a portion of the dust cover-receiving surface of the socket, which portion extends inward from a position at which the axial projection faces the dust cover-receiving surface, is formed by an inclined surface which approaches the socket-facing surface while extending inward from that position.

According to the above-described feature of the present invention, the ball joint is configured such that an annular axial projection is provided in a portion of the socket-facing surface of the dust cover which faces the socket, and an inclined surface is formed on the dust cover-receiving surface of the socket which faces the dust cover such that the inclined surface approaches the socket-facing surface while extending inward from a position where the axial projection faces the dust cover-receiving surface. In the ball joint configured as described above, by the tightening force of the retaining ring, the socket-fitting portion, the socket-facing surface, and the axial projection of the dust cover are pressed against the outer periphery of the stud-penetration opening portion of the socket and the inclined surface of the dust cover-receiving surface, respectively. Since the dust cover-receiving surface of the socket is formed by an inclined surface which is inclined toward the socket-facing surface, pressing forces in the axial direction of the dust cover are produced in the socket-facing surface and the axial projection pressed against the inclined surface, whereby contact force increases. Also, since the axial projection projects from the socket-facing surface, the contact pressure of the axial projection against the dust cover-receiving surface increases, whereby contact force increases. As a result, the ball joint of the present invention can enhance the waterproofing performance at the fitting region where the dust cover is fitted onto the socket compared with conventional ball joints.

Another feature of the present invention is as follows. In the above-described ball joint, an inner peripheral surface of the axial projection of the dust cover is formed by an inclined surface which expands in a radial direction of the dust cover toward an end of the axial projection.

According to the above-described feature of the present invention, the ball joint is configured such that the inner peripheral surface of the axial projection of the dust cover is formed by an inclined surface which expands in the radial direction of the dust cover toward the end of the axial projection. By virtue of this configuration, the inner peripheral surface of the axial projection of the dust cover and the inclined surface of the dust cover-receiving surface of the socket are formed by planes which have the same direction of inclination. Therefore, the ball joint can enhance the tight contact between the two surfaces.

Another feature of the present invention is as follows. In the above-described ball joint, the dust cover has a tapered flange portion on the outer side of the axial projection, the tapered flange portion being formed by an inclined surface which extends toward the dust cover-receiving surface while expanding in a radial direction of the dust cover; and the dust cover-receiving surface of the socket extends radially outward with respect to the axial projection of the dust cover, and the entirety of the dust cover-receiving surface is formed by an inclined surface which approaches the socket-facing surface while extending from the outer side toward the inner side.

According to the above-described feature of the present invention, the dust cover has a tapered flange portion on the outer side of the axial projection, the tapered flange portion being formed by an inclined surface which extends toward the dust cover-receiving surface while expanding in a radial direction of the dust cover; and the dust cover-receiving surface of the socket extends radially outward with respect to the axial projection of the dust cover, and the entirety of the dust cover-receiving surface is formed by an inclined surface which approaches the socket-facing surface while extending from the outer side toward the inner side. In the ball joint configured as described above, even in a region on the outer side of the axial projection of the dust cover, the tapered flange portion and the dust cover-receiving surface are strongly brought into tight contact with each other by a pressing force acting in the axial direction. As a result, the ball joint can further enhance the waterproofing performance at the fitting region where the dust cover is fitted onto the socket.

Another feature of the present invention is as follows. In the above-described ball joint, the tapered flange portion has a recess formed at a root portion of the axial projection such that the recess is concave with respect to the dust cover-receiving surface According to the above-described feature of the present invention, the ball joint is configured such that the tapered flange portion has a recess located adjacent to the axial projection such that the recess is concave with respect to the dust cover-receiving surface. By virtue of this configuration, when the dust cover is tightened by the retaining ring, the ball joint can prevent lifting of the tapered flange portion from the cover-receiving facing surface to thereby guarantee tight contact satisfactorily.

Another feature of the present invention is as follows. In the above-described ball joint, the dust cover-receiving surface of the socket projects outward beyond an end of the tapered flange portion of the dust cover.

According to the above-described feature of the present invention, the ball joint is configured such that the dust cover-receiving surface of the socket projects outward beyond an end of the tapered flange portion of the dust cover. By virtue of this configuration, unlike the case where the tapered flange portion of the dust cover projects outward beyond the end of the dust cover-receiving surface of the socket, the ball joint can prevent upward warpage or lifting of the tapered flange portion form the dust cover-receiving surface, to thereby satisfactorily maintain waterproofing performance.

Another feature of the present invention is as follows. In the above-described ball joint, the dust cover-receiving surface of the socket has an inclination angle smaller than that of the inclined surface formed on the socket-facing surface.

According to the above-described feature of the present invention, the ball joint is configured such that the dust cover-receiving surface of the socket has an inclination angle smaller than that of the inclined surface formed on the socket-facing surface. By virtue of this configuration, the ball joint can increase the contact area between the axial projection and the inclined surface of the dust cover-receiving surface when the axial projection is pressed against the inclined surface. Therefore, it is possible to effectively prevent entry of water to an inner portion (deeper portion) of the contact surface between the socket-facing surface of the dust cover and the dust cover-receiving surface of the socket.

Another feature of the present invention is as follows. In the above-described ball joint, the dust cover has an annular radial projection which projects from an inner peripheral surface of the socket-fitting portion.

According to the above-described feature of the present invention, the ball joint is configured such that the dust cover has an annular radial projection which projects from an inner peripheral surface of the socket-fitting portion. By virtue of this configuration, even when water reaches the gap between the outer periphery of the stud-penetration opening portion and the inner peripheral surface of the socket-fitting portion, the ball joint can prevent the water from further invading, i.e., from reaching the stud-penetration opening portion.

Another feature of the present invention is as follows. In the above-described ball joint, a portion of the socket-facing surface of the dust cover located inward of the axial projection is formed by an inclined surface which is inclined toward the socket-fitting portion.

According to the above-described feature of the present invention, the ball joint is configured such that a portion of the socket-facing surface of the dust cover located inward of the axial projection is formed by an inclined surface which is inclined toward the socket-fitting portion. By virtue of this configuration, even at an inner portion of the dust cover located on the inner side of the axial projection, that inner portion and the dust cover-receiving surface come into tight contact with each other due to a pressing force acting in the axial direction as in the case of the axial projection. Therefore, the ball joint can further enhance the waterproofing performance at the fitting region where the dust cover is fitted onto the socket.

MODES FOR CARRYING OUT THE INVENTION

Figure 1:
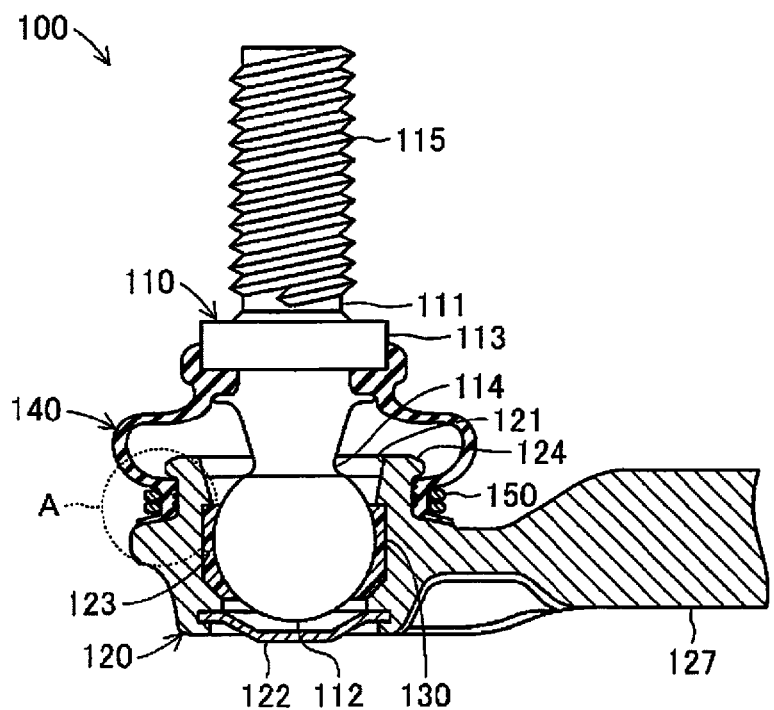
FIG. 1 is a partially sectional view schematically showing a vertical cross section of a ball joint according to an embodiment of the present invention.

Below, one embodiment of a ball joint according to the present invention will be explained while referring to the drawings. FIG. 1 is a partially sectional view schematically showing a vertical cross section of a ball joint 100 according to the present invention. The figures referred to in this description are schematically illustrated with some components exaggerated in order to facilitate an understanding of the present invention. Therefore, the dimensions, proportions and the like of the components may differ from the actual dimensions, proportions, etc. This ball joint 100 is a joint member for connecting components with each other in a suspension mechanism or a steering mechanism employed in a vehicle such as an automobile while permitting the angle between the components to vary.

(Structure of the Ball Joint 100)

The ball joint 100 is mainly composed of a ball stud 110, a socket 120, a ball seat 130, and a dust cover 140. The ball stud 110 is a shaft member formed of steel. The ball stud 110 includes a shaft-shaped stud portion 111 and a generally spherical ball portion 112 which are integrally formed with each other through a flange portion 113 and a neck portion 114. A male screw 115 for connecting the ball joint 100 to an unillustrated counterpart member is formed on the outer periphery of the stud portion 111. The surface of the ball portion 112 is subjected to grinding so as to allow smooth sliding between the ball portion 112 and the ball seat 130.

The socket 120 is formed by casting or forging steel or a nonferrous metal such as aluminum such that the socket 120 has an approximately cylindrical tubular shape. More specifically, one end portion (the upper end portion in FIG. 1) of the socket 120 forms a stud-penetration opening portion 121 which is open toward the upper side of the drawing, and the other end portion (the lower end portion in FIG. 1) of the socket 120 is closed by a plug 122. Thus, the socket 120 has the shape of a cylindrical tube with a bottom. The plug 122 is a plate member for closing the other end portion of the cylindrical tubular socket 120 and is formed from a steel material such that the plug 122 has the shape of an approximately circular plate having a concave central portion.

A holding portion 123 for receiving the ball portion 112 of the ball stud 110 through the ball seat 130 is formed inside the socket 120. A small flange portion 124 and a dust cover-receiving surface 126 are formed on the outer periphery of the socket 120. The small flange portion 124 projects outward from the upper end of the stud-penetration opening portion 121. The dust cover-receiving surface 126 is formed below the small flange portion 124 with a dust cover groove 125 formed therebetween. The dust cover-receiving surface 126 projects outward further than the small flange portion 124 and forms another flange of the socket 120.

The small flange portion 124 is a portion for preventing the dust cover 140 which is fitted into the dust cover groove 125 from coming off. The dust cover groove 125 defines a cylindrical portion of the socket 120 against which radial projections 142 of the dust cover 140 are pressed. The cylindrical portion has a uniform outer shape along the axial direction and has a smooth curved surface having no unevenness.

Figure 2:
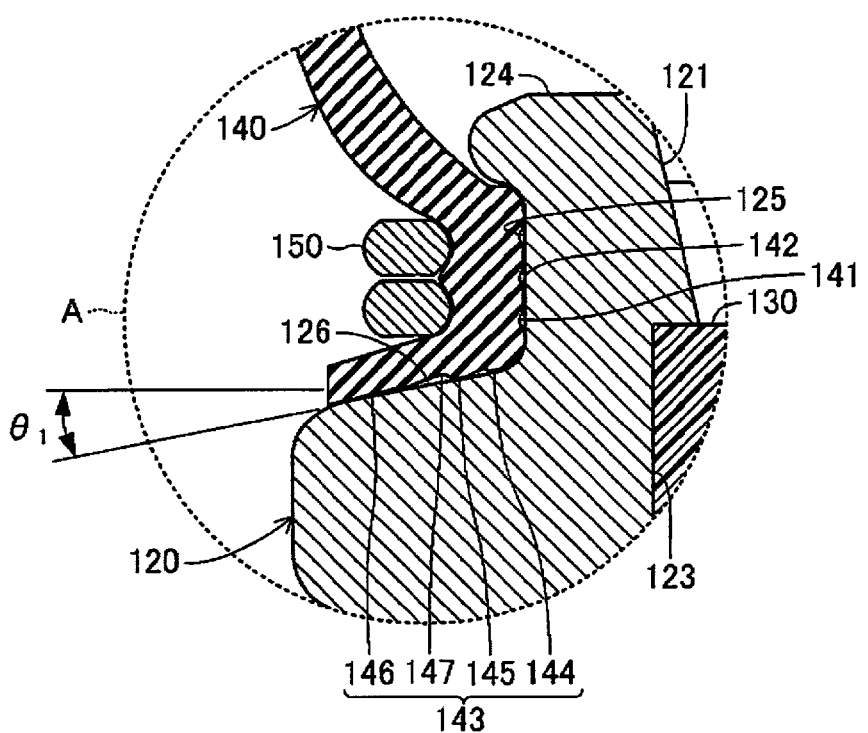
FIG. 2 is an enlarged sectional view showing, on an enlarged scale, a fitting region which is located in a dashed-line circle A shown in FIG. 1 and in which a dust cover and a socket of the ball joint are fitted to each other.

As specifically shown in FIG. 2, the dust cover-receiving surface 126 receives a socket-facing surface 143 of the dust cover 140 which is formed at the lower end of the dust cover 140 in FIG. 2. The dust cover-receiving surface 126 is an inclined surface which is inclined upward in FIG. 2, i.e., it approaches the socket-facing surface 143 while extending from the outer side toward the inner side of the dust cover-receiving surface 126. In the present embodiment, the dust cover-receiving surface 126 has an inclination angle $\theta_1$ of about 10 degrees with respect to the radial direction of the socket 120 (the horizontal direction shown in FIG. 2). An end of the dust cover-receiving surface 126 projects outward beyond the socket-facing surface 143 of the dust cover 140.

An arm 127 is provided on the outer periphery of the socket 120. The arm 127 is a portion which extends in a rod-like shape and which is used to connect the ball joint 100 to another component. The above-described socket 120 is connected to one end of the arm 127 (on the left side in FIG. 1), and the socket of an unillustrated ball joint similar to the ball joint 100 is connected to the other end of the arm 127 (on the right side in FIG. 1). Namely, the ball joint 100 is provided at either or both opposite ends of a shaft-shaped connecting member such as a stabilizer link or a tie rod end.

The ball seat 130, which serves as a bearing seat, is fitted into the holding portion 123 of the socket 120 in a state in which the ball seat 130 is supported by the plug 122. The ball seat 130 is a member which is formed of a synthetic resin (e.g., a PEEK resin) and holds the ball portion 112 of the ball stud 110 within the holding portion 123 of the socket 120 in a state in which the ball portion 112 can slide for rotational movement. The ball seat 130 has a generally U-shaped vertical cross section. Unillustrated grease for providing lubrication between the inner peripheral surface of the ball seat 130 and the outer peripheral surface of the ball portion 112 is applied to upper and lower opening portions of the ball seat 130.

Figure 3:
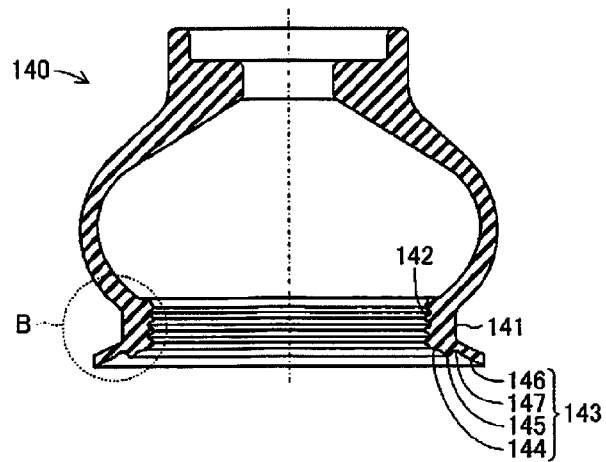
FIG. 3 is a sectional view showing the entirety of the dust cover of the ball joint shown in FIG. 1.

The dust cover 140 is provided above the socket 120 so as to cover the ball seat 130 and the ball portion 112 of the ball stud 110, which are accommodated in the holding portion 123. As shown in FIG. 3, the dust cover 140 is formed of, for example, a rubber material or a soft synthetic material which is elastically deformable, and it has the shape of a generally cylindrical tube having a bulged central portion. One open end of the dust cover 140 (on the upper side in FIG. 3) has an inner diameter suitable for fitting onto the outer periphery of the ball stud 110, and a socket-fitting portion 141 which is fitted onto the bottom of the dust cover groove 125 of the socket 120 is formed at the other open end of the dust cover 140 (on the lower side in FIG. 3).

Figure 4:
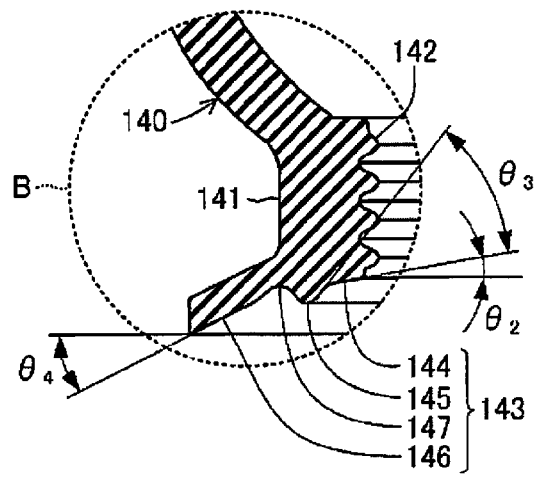
FIG. 4 is an enlarged sectional view showing, on an enlarged scale, a portion of the dust cover located in a dashed-line circle B shown in FIG. 3, i.e., a socket-fitting portion and a socket-facing surface of the dust cover.

As specifically shown in FIG. 4, the socket-fitting portion 141 is a cylindrical tubular portion which is fitted into the dust cover groove 125 of the socket 120 and which has an inner diameter smaller than the outer diameter of the dust cover groove 125. The radial projections 142 are formed on the inner peripheral surface of the socket-fitting portion 141. The radial projections 142 are annular projections which project toward the inner side of the socket-fitting portion 141 so as to prevent entry of foreign substances such as water droplets and dust in cooperation with the bottom of the dust cover groove 125. A plurality (four in the present embodiment) of the radial projections 142 are formed along the axial direction of the dust cover 140. The socket-facing surface 143 is formed on the end surface of the socket-fitting portion 141 such that the socket-facing surface 143 faces the dust cover-receiving surface 126 of the socket 120.

The socket-facing surface 143 is pressed against the dust cover-receiving surface 126 of the socket 120 when the dust cover 140 is attached to the socket 120. The socket-facing surface 143 defines a flange of the dust cover 140 which projects in the radial direction of the dust cover 140. More specifically, the socket-facing surface 143 is a tapered, inclined surface which extends toward the dust cover-receiving surface 126 while expanding radially from the lower end of the radial projections 142. The socket-facing surface 143 includes an inner tapered portion 144, an axial projection 145, and a tapered flange portion 146 formed in this order from the side where the radial projections 142 are formed toward the outer peripheral side.

The inner tapered portion 144 is an inclined surface which extends from the side where the radial projections 142 are formed to a position near the center of the socket-fitting portion 141 in a thickness direction thereof and which is inclined slightly with respect to a horizontal plane. In the present embodiment, the inner tapered portion 144 has an inclination angle $\theta_2$ of about 10 degrees with respect to the radial direction of the dust cover 140 (the horizontal direction in FIG. 4).

The axial projection 145 is an annular projection which projects toward the dust cover-receiving surface 126 (the lower side in FIG. 4) and which has a center which is located at a radial position approximately corresponding to the outer edge of the dust cover groove 125 of the socket 120. An inner peripheral surface of the axial projection 145 which faces toward the inner side of the dust cover 140 is formed by an inclined surface which expands toward an end of the axial projection 145 in the radial direction of the dust cover 140, and the end of the axial projection 145 is formed with an arcuate shape. In the present embodiment, the inner peripheral surface of the axial projection 145 has an inclination angle $\theta_3$ of 30 degrees with respect to the inner tapered surface 144. The amount of projection of the axial projection 145 in the axial direction from the lower end of the radial projections 142, i.e., from the most inner peripheral edge of the inner tapered portion 144, is set to a range of 0.1 to 1.5 mm.

The tapered flange portion 146 is formed on the outer side, in the radial direction of the dust cover 140 of a root portion of the outer peripheral surface of the axial projection 145 and is formed by an inclined surface having an end which projects toward the dust cover-receiving surface 126 (the lower side in FIG. 4) with respect to the end of the axial projection 145. In the present embodiment, the inclination angle $\theta_4$ of the tapered flange portion 146 is greater than the inclination angle $\theta_2$ of the inner tapered surface 144. The tapered flange portion 146 has a length determined such that the end of the tapered flange portion 146 is located on the inner side of the end (outer periphery) of the dust cover-receiving surface 126 of the socket 120.

A grove-shaped recess 147 is annularly formed between the tapered flange portion 146 and the axial projection 145. The recess 147, which is a groove for preventing upward warpage of the tapered flange portion 146, is formed at the root of the outer peripheral surface of the axial projection 145 such that the recess 147 is concave with respect to the dust cover-receiving surface 125 of the socket 120.

A retaining ring 150 is fitted onto the outer periphery of the socket-fitting portion 141. The retaining ring 150 is a metallic member for tightening the outer periphery of the socket-fitting portion 141 so as to press the radial projections 142 and the socket-facing surface 143 against the bottom of the dust cover groove 125 and the dust cover-receiving surface 126, respectively, to thereby fix the dust cover 140 to the socket 120. The retaining ring 150 is made by forming a steel material into a ring shape.

(Assembly of the Ball Joint 100)

Assembly of the ball joint 100 having the above-described structure will be described. In this description of assembly of the ball joint 100, steps which do not relate directly to the present invention will be omitted.

First, a worker prepares the ball stud 110, the ball seat 130, and the plug 122, which are the components of the ball joint 100. The ball stud 110 is formed into a rod-like shape in advance by forging or grinding. The ball seat 130 is formed into a cylindrical tubular shape in advance by injection molding. The plug 122 is formed into a disc-like shape in advance by press working. Next, the worker sets these components in an unillustrated die for forming the socket 120. In this case, the ball stud 110 is set in the die in a state in which the ball portion 112 is slidably held in the ball seat 130 for rotational motion.

Next, the worker charges an aluminum alloy for casting (aluminum die casting) into the die in which the ball stud 110, the ball seat 130, and the plug 122 have been set. As a result, the socket 120 including the ball stud 110, the ball seat 130, and the plug 122 combined together is formed. In the present embodiment, the socket 120 is formed in a state in which the arm 127 is integrally formed on the outer periphery of the socket 120. Next, the worker attaches the dust cover 140 to the socket 120 having the ball stud 110, the ball seat 130, and the plug 122.

Specifically, after having prepared the dust cover 140 and the retaining ring 150, the worker fits the one open end (the upper end in the drawings) of the dust cover 140 onto the outer periphery of the ball stud 110. Subsequently, the worker radially expands the other open end (the lower end in the drawings) of the dust cover 140, i.e., the socket-fitting portion 141, and fits the other open end into the dust cover groove 125 of the socket 120. Then, the worker fits the retaining ring 150 onto the outer peripheral surface of the socket-fitting portion 141.

In this case, the socket-fitting portion 141 of the dust cover 140 is strongly pressed against the bottom of the dust cover groove 125 by the tightening force of the retaining ring 150. As a result, the radial projections 142 formed on the inner side of the socket-fitting portion 141 are strongly pressed against the bottom of the dust cover groove 125, whereby they are collapsed and come into tight contact with the bottom of the dust cover groove 125. Also, the socket-facing surface 143 of the socket-fitting portion 141 frictionally slides on the dust cover-receiving surface 126 of the socket 120 toward the inner side in the radial direction of the dust cover 140. In this case, the dust cover-receiving surface 126 of the socket 120 is inclined toward the socket-facing surface 143.

Therefore, in addition to a pressing force toward the inner side in the radial direction of the dust cover 140 and the socket 120, a pressing force in the axial direction of the dust cover 140 and the socket 120 acts on the socket-facing surface 143 including the axial projection 145. As a result, the socket-facing surface 143 of the dust cover 140, including the axial projection 145, is strongly brought into tight contact with the dust cover-receiving surface 125 of the socket 120 in a state in which the axial projection 145 is collapsed while being dragged toward the inner side in the radial direction of the dust cover 140 and the socket 120.

The axial projection 145 provided on the socket-facing surface 143 of the dust cover 140 is formed such that the axial projection 145 projects from the socket-facing surface 143 toward the dust cover-receiving surface 125 of the socket 120. Therefore, the axial projection 145 is pressed against the dust cover-receiving surface 125 with a stronger pressing force (contact pressure) compared with the inner tapered portion 144 and the tapered flange portion 146. By virtue of these configurations, the dust cover-receiving surface 126 and the socket-facing surface 143 including the axial projection 145 are brought into tight contact with each other by a very high pressure, whereby entry of water droplets or oil droplets can be prevented. Since the socket-facing surface 143 of the dust cover 140 has the recess 147 provided at the root portion of the outer peripheral surface of the axial projection 145, upward warpage of the tapered flange portion 146 can be prevented, and the tight contact with the dust cover-receiving surface 126 can be maintained satisfactorily.

Attachment of the dust cover 140 to the socket 120 completes the ball joint 100. When the worker casts the socket 120 and when the worker attaches the dust cover 140, the worker charges unillustrated grease into the space between the plug 122 and the ball portion 112 of the ball stud 110 and applies the grease to the inner peripheral surface of the ball seat 130 and the outer peripheral surface of the ball portion 112 exposed from the stud-penetration opening portion 121. Thus, the ball portion 112 can be smoothly slid for rotational movement.

(Operation of the Ball Joint 100)

Operation of the ball joint 100 having the above-described structure will be described. The ball joint 100 is used as a joint member in a suspension mechanism or a steering mechanism employed in an unillustrated vehicle. When the vehicle travels, vibration and load (specifically, various stresses such as bending stress, tensile stress, compressive stress, and shearing stress) which change in accordance with the motions of the wheels and the attitude of the vehicle act on the ball joint 100.

In this case, due to the above-described load, vibration also acts on the dust cover 140 of the ball joint 100. However, since the dust cover-receiving surface 126 is inclined, pressing forces act on the socket-facing surface 143 of the dust cover 140 not only in the radial direction of the dust cover 140 but also in the axial direction thereof. Therefore, the ball joint 100 can accurately maintain the tight contact of the inner tapered portion 144, the axial projection 145, and the tapered flange portion 146 against the dust cover-receiving surface 126.

In particular, since the axial projection 145 projects from the socket-facing surface 143, very tight contact can be maintained through concentration of contact pressure. Also, since the concave recess 147 is provided between the tapered flange portion 146 and the axial projection 145, upward warpage of the tapered flange portion 146 can be prevented, whereby the tight contact against the dust cover-receiving surface 126 can be maintained satisfactorily. Furthermore, since the radial projections 142 are formed on the socket-fitting portion 141 of the dust cover 140 such that the radial projections 142 project from the inner peripheral surface of the socket-fitting portion 141, very tight contact can be maintained through concentration of contact pressure. Therefore, even when water reaches the inner tapered portion 144, it is possible to effectively prevent entry of water into the interior of the dust cover 140 beyond the radial projections 142. By virtue of these configurations, the ball joint 100 can effectively prevent entry of water droplets or oil droplets into the interior of the dust cover 140.

As can be understood from the above-described operating method, according to the present embodiment, the ball joint 100 is configured as follows. The dust cover 140 has the annular axial projection 145 which projects from (occupies) a portion of the socket-facing surface 143 facing the socket 120. A portion of the dust cover-receiving surface 126 of the socket 120, which portion extends inward from a position at which the axial projection 145 faces the dust cover-receiving surface 126, is formed by an inclined surface which approaches the socket-facing surface 143 while extending inward from that position. As a result, in the ball joint 100, the socket-fitting portion 141, the socket-facing surface 143, and the axial projection 145 of the dust cover 140 are pressed against the outer periphery of the stud-penetration opening portion 121 of the socket 120 and the inclined surface of the dust cover-receiving surface 126, respectively, by the tightening force of the retaining ring 150. Since the dust cover-receiving surface 126 of the socket 120 is formed by an inclined surface which is inclined toward the socket-facing surface 143, pressing forces in the axial direction of the dust cover 140 are produced in the socket-facing surface 143 and the axial projection 145 pressed against the inclined surface, whereby contact force increases. Also, since the axial projection 145 projects from the socket-facing surface 143, the contact pressure of the axial projection 145 against the dust cover-receiving surface 126 increases, whereby contact force increases. As a result, the ball joint 100 of the present invention can enhance the waterproofing performance at the fitting region where the dust cover 140 is fitted onto the socket 120 compared with conventional ball joints.

The present invention is not limited to the above-described embodiment, and it may be modified in various ways without departing from the scope of the present invention. In drawings which show modified embodiments to be described below, portions identical to those of the above-described embodiment are denoted by the same reference numerals, and their description will not be repeated.

In the above-described embodiment, the entire dust cover-receiving surface 126 of the socket 120 is an inclined surface which approaches the socket-facing surface 143 of the dust cover 140 while extending from the outer side toward the inner side. However, it is sufficient to form the dust cover-receiving surface 126 of the socket 120 at least in a region on the inner side of the position where the axial projection 145 of the dust cover 140 faces the dust cover-receiving surface 126.

Figure 5:
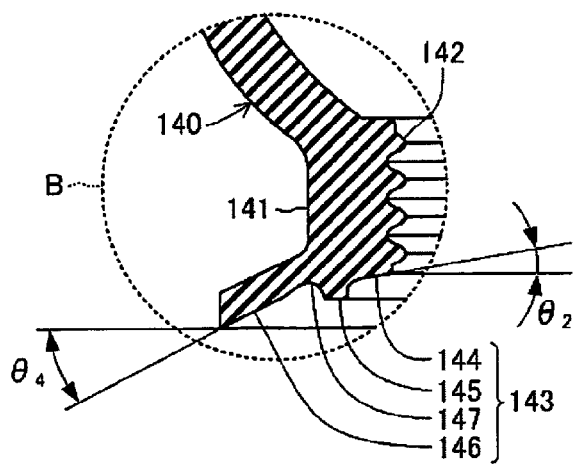
FIG. 5 is an enlarged sectional view corresponding to FIG. 4 and showing, on an enlarged scale, a socket-fitting portion and a socket-facing surface of a dust cover according to a modified embodiment of the present invention.

In the above-described embodiment, the inner peripheral surface of the axial projection 145 of the dust cover 140 is an inclined surface. However, the inner peripheral surface of the axial projection 145 may be formed in parallel to the axial direction of the dust cover 140 as shown in FIG. 5.

In the above-described embodiment, the dust cover 140 has the tapered flange portion 146 formed on the outer side of the axial projection 145 of the socket-facing surface 143. However, the dust cover 140 can exhibit sufficiently high waterproofing performance even when the tapered flange portion 146 is not formed on the outer side of the axial projection 145 of the socket-facing surface 143, i.e., even when the outermost peripheral portion of the socket-facing surface 143 is the axial projection 145. Namely, the tapered flange portion 146 is provided so as to further enhance the waterproofing performance of preventing entry of water droplets or oil droplets through the gap between the dust cover 140 and the socket 120. Accordingly, in the case where the tapered flange portion 146 is provided on the socket-facing surface 143, the dust cover 140 is not required to have the recess 147.

In the above-described embodiment, the ball joint 100 is configured such that the outer peripheral edge of the dust cover-receiving surface 126 of the socket 120 projects outward beyond the outer peripheral edge of the socket-facing surface 143 of the dust cover 140. By virtue of this configuration, the ball joint 100 can effectively prevent entry of water due to warpage of an outer peripheral portion of the socket-facing surface 143. However, in the case where warpage of the outer peripheral portion of the socket-facing surface 143 is permissible, the ball joint 100 may be configured such that the outer peripheral edge of the socket-facing surface 143 of the dust cover 140 projects outward beyond the outer peripheral edge of the dust cover-receiving surface 126 of the socket 120.

In the above-described embodiment, the inclination angle $\theta_1$ of the dust cover-receiving surface 126 of the socket 120 is smaller than the inclination angle $\theta_3$ of the inner peripheral surface of the axial projection 145 of the socket-facing surface 143 of the dust cover 140. By virtue of this configuration, the ball joint 100 can increase the contact area between the axial projection 145 and the inclined surface of the dust cover-receiving surface 126 when the axial projection 145 is pressed against the inclined surface. Therefore, it is possible to effectively prevent entry of water to an inner portion (deeper portion) of the contact surface between the socket-facing surface 143 of the dust cover 140 and the dust cover-receiving surface 126 of the socket 120. Accordingly, when the inclination angle $\theta_1$ of the dust cover-receiving surface 126 is made smaller than an inclination angle other than the inclination angle $\theta_3$ of the inner peripheral surface of the axial projection 145 of the socket-facing surface 143 of the dust cover 140, i.e., the inclination angle $\theta_2$ of the inner tapered portion 144 or the inclination angle $\theta_4$ of the tapered flange portion 146, it is expected that the inner tapered portion 144 and the tapered flange portion 146 achieve the same action and effect as those of the axial projection 145.

The ball joint 100 can exhibit waterproofing performance at the contact surface between the socket-facing surface 143 and the dust cover-receiving surface 126 even when the inclination angle $\theta_1$ of the dust cover-receiving surface 126 of the socket 120 is set to an inclination angle equal to or greater than at least one of the inclination angles $\theta_2$ to $\theta_4$ of the socket-facing surface 143 of the dust cover 140.

In the above-described embodiment, the inclination angle of the tapered flange portion 146 of the socket-facing surface 143 of the dust cover 140 is set to be greater than the inclination angle of the inner tapered portion 144. However, since the inclination angle of the tapered flange portion 146 is set in consideration of the tight contact to be established between the tapered flange portion 146 and the dust cover-receiving surface 126 of the socket 120, it is of course possible to set the inclination angle of the tapered flange portion 146 to an angle which is equal to or smaller than the inclination angle of the inner tapered portion 144.

In the above-described embodiment, the end portions of the axial projection 145 and the radial projections 142 are formed with an arcuate shape. However, the shapes of the end portions of the axial projection 145 and the radial projections 142 are not limited to the shapes employed in the above-described embodiment, and the end portions of the axial projection 145 and the radial projections 142 may be formed with a shape other than an arcuate shape, such as a triangular shape, a rectangular shape, or an elliptical shape. Also, the end portions of the axial projection 145 and the radial projections 142 may be formed to have two, three, or more ridges.

In the above-described embodiment, the axial projection 145 is a single annular projection formed on the socket-facing surface 143. However, two or more annular projections may be formed on the socket-facing surface 143 along the radial direction thereof as the axial projection 145.

Figure 6:
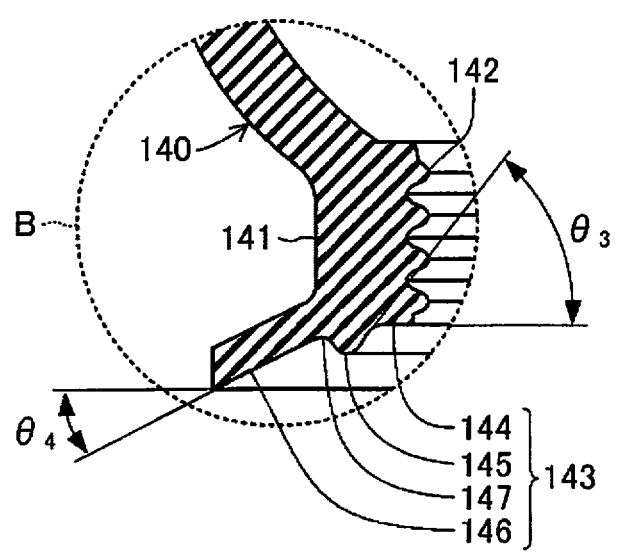
FIG. 6 is an enlarged sectional view corresponding to FIG. 4 and showing, on an enlarged scale, a socket-fitting portion and a socket-facing surface of a dust cover according to another modified embodiment of the present invention.

In the above-described embodiment, the inner tapered portion 144 of the socket-facing surface 143 of the dust cover 140 is formed by an inclined surface. However, as shown in FIG. 6, the inner tapered portion 144 of the socket-facing surface 143 of the dust cover 140 may be formed in parallel to the radial direction of the dust cover 140 (in the horizontal direction in FIG. 6).

In the above-described embodiment, the plurality of radial projections 142 are formed on the inner peripheral surface of the socket-fitting portion 141 of the dust cover 140. The radial projections 142 prevent water which has reached the inner tapered portion 144 of the socket-facing surface 143 from entering the interior of the dust cover 140 beyond the inner tapered portion 144 to thereby enhance the reliability of the waterproofing performance. Accordingly, the number of radial projections 142 may be determined in accordance with the waterproofing performance required at the inner peripheral surface of the socket-fitting portion 141; namely, it is sufficient for the dust cover 140 to have at least one radial projection 142. Also, the radial projections 142 may be omitted when the waterproofing performance realized by the socket-facing surface 143 of the dust cover 140 and the dust cover-receiving surface 126 of the socket 120 is sufficient or when waterproofing performance at the inner peripheral surface of the socket-fitting portion 141 is not required to be taken into consideration.

DESCRIPTION OF SYMBOLS $\theta_1$ . . . inclination angle of the dust cover-receiving surface with respect to the radial direction of the socket
$\theta_2$ . . . inclination angle of the inner tapered portion with respect to the radial direction of the dust cover
$\theta_3$ . . . inclination angle of the inner peripheral surface of the axial projection with respect to the inner tapered portion
$\theta_4$ . . . inclination angle of the tapered flange portion with respect to the radial direction of the dust cover
100 . . . ball joint,
110 . . . ball stud, 111 . . . stud portion, 112 . . . ball portion, 113 . . . flange portion,
114 . . . neck portion, 115 . . . male screw,
120 . . . socket, 121 . . . stud-penetration opening portion, 122 . . . plug, 123 . . . holding portion, 124 . . . small flange portion, 125 . . . dust cover groove, 126 . . . dust cover-receiving surface, 127 . . . arm,
130 . . . ball seat,
140 . . . dust cover, 141 . . . socket-fitting portion, 142 . . . radial projections, 143 . . . socket-facing surface, 144 . . . inner tapered portion, 145 . . . axial projection, 146 . . . tapered flange portion, 147 . . . recess,
150 . . . retaining ring.

The invention claimed is:

1. A ball joint comprising:
a ball stud which has a shaft-shaped stud portion and a ball portion which is formed at an end of the stud portion and has a spherical surface;
a socket which has an open upper end, a lower end, a central axis which extends between the upper and lower ends, a holding portion which is formed inside the socket for slidably accommodating the ball portion of the ball stud, a dust cover-receiving surface which is formed on an exterior of the socket and which has a sloping portion which is sloped by a non-zero angle of inclination with respect to a plane normal to the axis of the socket, and a groove which is formed on the exterior of the socket between the dust cover-receiving surface and the upper end of the socket;
a tubular dust cover which is formed of an elastic material and has an upper end which is fit onto an outer periphery of the stud portion, a lower end which has a socket-fitting portion which is disposed inside the groove and a socket-facing surface which faces the dust cover-receiving surface of the socket, and a central axis which extends between the upper and lower ends of the dust cover, the socket-facing surface having an annular projection which projects in an axial direction of the dust cover away from the upper end of the dust cover and an inner portion which is disposed on a radially inner side of the annular projection with respect to the axis of the dust cover, the annular projection having an inner peripheral surface which is formed on the radially inner side of the annular projection, the annular projection and the inner portion of the socket-facing surface contacting the sloping portion of the dust cover-receiving surface when the dust cover is mounted on the socket, and when the dust cover is not mounted on the socket, the inner peripheral surface of the annular projection has a non-zero angle of inclination with respect to a plane normal to the axis of the dust cover which is greater than an angle of inclination of the inner portion of the socket-facing surface with respect to a plane normal to the axis of the dust cover; and a retaining ring which is disposed around the socket-fitting portion of the dust cover and retains the socket-fitting portion in the groove of the socket.

2. A ball joint as claimed in claim 1 wherein:

the dust cover includes a flange which is formed on a radially outer side of the annular projection and extends to a radially outer edge of the lower end of the dust cover, the flange having a bottom surface which is sloped with respect to a plane normal to the axis of the dust cover and contacts the dust cover-receiving surface when the dust cover is mounted on the socket.

3. A ball joint as claimed in claim 2 wherein the dust cover-receiving surface is sloped with respect to a plane normal to the axis of the socket over an entire length of the socket-facing surface of the dust cover in a radial direction of the dust cover.

4. A ball joint as claimed in claim 2 wherein the socket-facing surface of the dust cover includes an annular recess which is formed between the flange and the annular projection adjoining a root portion of the annular projection and which is concave with respect to the dust cover-receiving surface when the dust cover is mounted on the socket.

5. A ball joint as claimed in claim 2 wherein the dust cover-receiving surface of the socket extends beyond a radially outer end of the flange in a radial direction of the socket.

6. A ball joint as claimed in claim 2 wherein when the dust cover is not mounted on the socket, the bottom surface of the flange has an angle of inclination with respect to a plane normal to the axis of the dust cover which is greater than the angle of inclination of the inner portion of the socket-facing surface of the dust cover with respect to a plane normal to the axis of the dust cover.

7. A ball joint as claimed in claim 2 wherein when the dust cover is not mounted on the socket, the bottom surface of the flange comprises a frustoconical zurface having a radius measured from the axis of the dust cover which increases with increasing distance from the upper end of the dust cover.

8. A ball joint as claimed in claim 1 wherein the angle of inclination of the sloping portion of the dust cover-receiving surface with respect to a plane normal to the axis of the socket is smaller than the angle of inclination of the inner peripheral surface of the annular projection with respect to a plane normal to the axis of the dust cover when the dust cover is not mounted on the socket.

9. A ball joint as claimed in claim 1 wherein the dust cover has an annular radial projection which projects from an inner peripheral surface of the socket-fitting portion and contacts an interior surface of the groove.

10. A ball joint as claimed in claim 1 wherein the inner portion of the socket-facing surface is inclined with respect to a plane normal to the axis of the dust cover when the dust cover is not mounted on the socket.

11. A ball joint as claimed in claim 1 wherein the angle of inclination of the inner portion of the socket-facing surface of the dust cover with respect to a plane normal to the axis of the dust cover when the dust cover is not mounted on the socket is the same as the angle of inclination of the sloping portion of the dust cover-receiving surface of the socket.

12. A ball joint as claimed in claim 1 wherein the inner portion of the socket-facing surface comprises a planar surface which adjoins the annular projection and extends normal to the axis of the dust cover when the dust cover is not mounted on the socket.

13. A ball joint as claimed in claim 1 wherein when the dust cover is not mounted on the socket, the inner portion of the socket-facing surface comprises a frustoconical surface which adjoins the annular projection and has a radius measured from the axis of the dust cover which increases with increasing distance from the upper end of the dust cover.

* * * * *